(12) United States Patent
Orii

(10) Patent No.: US 7,938,480 B2
(45) Date of Patent: May 10, 2011

(54) VEHICLE BODY SIDE STRUCTURE

(75) Inventor: Taku Orii, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 77 days.

(21) Appl. No.: 12/514,640

(22) PCT Filed: Nov. 19, 2007

(86) PCT No.: PCT/JP2007/072400
§ 371 (c)(1),
(2), (4) Date: May 13, 2009

(87) PCT Pub. No.: WO2008/062760
PCT Pub. Date: May 29, 2008

(65) Prior Publication Data
US 2010/0060036 A1    Mar. 11, 2010

(30) Foreign Application Priority Data

Nov. 24, 2006  (JP) .................................. 2006-317838

(51) Int. Cl.
*B62D 25/04* (2006.01)
*B62D 25/02* (2006.01)
(52) U.S. Cl. .......... 296/193.06; 296/203.03; 296/193.05
(58) Field of Classification Search ............. 296/193.06, 296/193.05, 209, 203.03
See application file for complete search history.

(56) References Cited

U.S. PATENT DOCUMENTS

| 4,557,519 A * | 12/1985 | Matsuura ..................... 296/204 |
| 4,978,164 A * | 12/1990 | Nakamura et al. ........ 296/193.04 |
| 6,209,950 B1 * | 4/2001 | Hanyu ..................... 296/203.02 |
| 2003/0071487 A1 * | 4/2003 | Dahl et al. .............. 296/190.08 |

FOREIGN PATENT DOCUMENTS

| JP | 10-053097 A | 2/1998 |
| JP | 2001-171552 A | 6/2001 |
| JP | 2002-362434 A | 12/2002 |

* cited by examiner

*Primary Examiner* — Dennis H Pedder

(57) ABSTRACT

A body side structure 3 includes an outer panel 4 integratedly formed by press forming, an inner panel 5, and a reinforcement 6. The outer panel 4 includes a front pillar outer section 12, and an outer front end lower portion 13 extending downward from the front pillar outer section 12. The inner panel 5 includes a front pillar inner section 26, and an inner front end lower portion 27 extending downward from the front pillar inner section 26. A flange 43 of the reinforcement 6 is joined to the inner front end lower portion 27. A lower edge 23 of the outer front end lower portion 13 is adjacent to or in contact with an outer surface 45 of the flange 43 of the reinforcement 6 at a higher position than a lower edge 36 of the inner front end lower portion 27 and a lower edge 44 of the flange 43 of the reinforcement 6.

4 Claims, 8 Drawing Sheets

VEHICLE BODY SIDE STRUCTURE

TECHNICAL FIELD

The present invention relates to a vehicle body side structure.

BACKGROUND ART

A body side forming a cab side includes an outer panel, an inner panel arranged facing the inner side of the outer panel in the vehicle width direction, and a reinforcement member arranged between the outer panel and the inner panel, wherein these are joined together through welding. Moreover, it is well known that the outer panel is integratedly formed by press forming using a metal plate material such as sheet steel or aluminum alloy sheet (e.g., rolling material).

[Patent Document 1] Japanese Unexamined Patent Application Publication No. 2002-362434

DISCLOSURE OF INVENTION

Problem to be Solved by the Invention

Here, the outer panel includes a front pillar outer section arranged in front of the door opening, and an outer front end lower portion extending downward from the front pillar outer section, wherein the upper edge of the front pillar outer section and the lower edge of the outer front end lower portion are arranged on the top and the bottom of the outer panel, respectively. Moreover, the lower edge of the outer front edge lower portion is joined to and arranged on an outer surface of the reinforcement member in front of the lower edge of the reinforcement member and the lower edge of the inner panel.

In order to press form the lower edge of the outer front edge lower portion, excess metal in the periphery thereof is generally required. Therefore, the entire width of the metal plate material needs to be set according to distance between the upper edge of the front pillar outer section and the lower edge of the outer front end lower portion including the excess metal. In other words, since the position of the lower edge of the outer front end lower portion depends on position of the lower edge of the inner panel or the lower edge of the reinforcement member, if the front edge lower portion of the inner panel and front edge lower portion of the reinforcement member extend downward, the outer front end lower portion must also extend downward. In this case, the distance between the upper edge of the front pillar outer section and the lower edge of the outer front end lower portion increases, leading to growth in size of the metal plate material and increase in cost.

These inconveniences may be avoided by setting the entire width of the metal plate material according to width of the outer panel in the vehicle front-back direction. However, when there is difference only in width of the side panel in the vehicle front-back direction, metal plate material must be prepared for every differing outer panel in the vehicle front-back direction, which leads to complications in manufacturing these outer panels.

Therefore, an objective of the present invention is to provide a vehicle body side structure allowing integrated formation of an outer panel through press formation without any growth in size of the metal plate material used in die cutting.

Means of Solving the Problem

The vehicle body side structure according to the present invention, which should accomplish the above-given purpose, includes an outer panel integratedly formed by press forming, an inner panel arranged facing the inner side of the outer panel in the vehicle width direction, and a reinforcement arranged between the outer panel and the inner panel. The outer panel includes a front pillar outer section, and an outer front end lower portion extending downward from the front pillar outer section. The inner panel includes a front pillar inner section, and an inner front end lower portion extending downward from the front pillar inner section. The front pillar outer section and the front pillar inner section form a closed cross section, which partitions the front of a door opening. A front end lower portion of the reinforcement is joined to the inner front end lower portion. A lower edge of the outer front end lower portion is adjacent to or in contact with outer surface of the front end lower portion of the reinforcement at a higher position than lower edge of the inner front end lower portion and lower edge of the front end lower portion of the reinforcement.

With this structure, since the outer panel is integratedly formed by press forming, manufacturing of the outer panel may be simplified.

Moreover, the lower edge of the outer front end lower portion of the outer panel is arranged in a position higher than the lower edge of the inner front end lower portion and lower edge of the front end lower portion of the reinforcement, and in front of the outer surface of the front end lower portion of the reinforcement. Therefore, height of the outer front end lower portion may be set short irrelevantly to positions of the lower edge of the inner front end lower portion or the lower edge of the flange of the reinforcement. As a result, distances heightwise of the upper edge of the front pillar outer section and the lower edge of the outer front end lower portion is shortened as said height is shortened, thereby allowing a shorter entire width of the metal plate material used for die cutting the outer panel, and reduction in cost. Moreover, since the entire width of the metal plate material may be set according to distance heightwise of the outer panel, a shared metal plate material may be used for vehicle types differing in only width of the outer panel in the vehicle front-back direction. Therefore, since the metal plate material will be made uniform, provision of a simple structure of the outer panels is possible.

Alternatively, the structure may include a sealing member, which seals at least a part of between the outer front end lower portion and the front end lower portion of the reinforcement.

With this structure, the sealing member is applied in part of the gap formed between the lower edge of the outer front end lower portion and the outer surface of the front end lower portion of the reinforcement. Namely, application of the sealing member needs only to be carried out in a portion of the gap through which rainwater and the like can easily penetrate into the outer panel. Even if rainwater or the like penetrates into the outer panel via the gap, the rainwater and the like from the gap in which the sealing member is not applied may be sufficiently discharged below. As a result, application of the sealing member in the entire gap is unnecessary, allowing simplification of manufacturing and reduction in cost.

Result of the Invention

A simple structure according to the present invention allows control of growth in size of a metal plate material used in die cutting, and integrated formation of an outer panel used for the body sides formed through press forming.

DESCRIPTION OF REFERENCE NUMERALS

Figure 1:
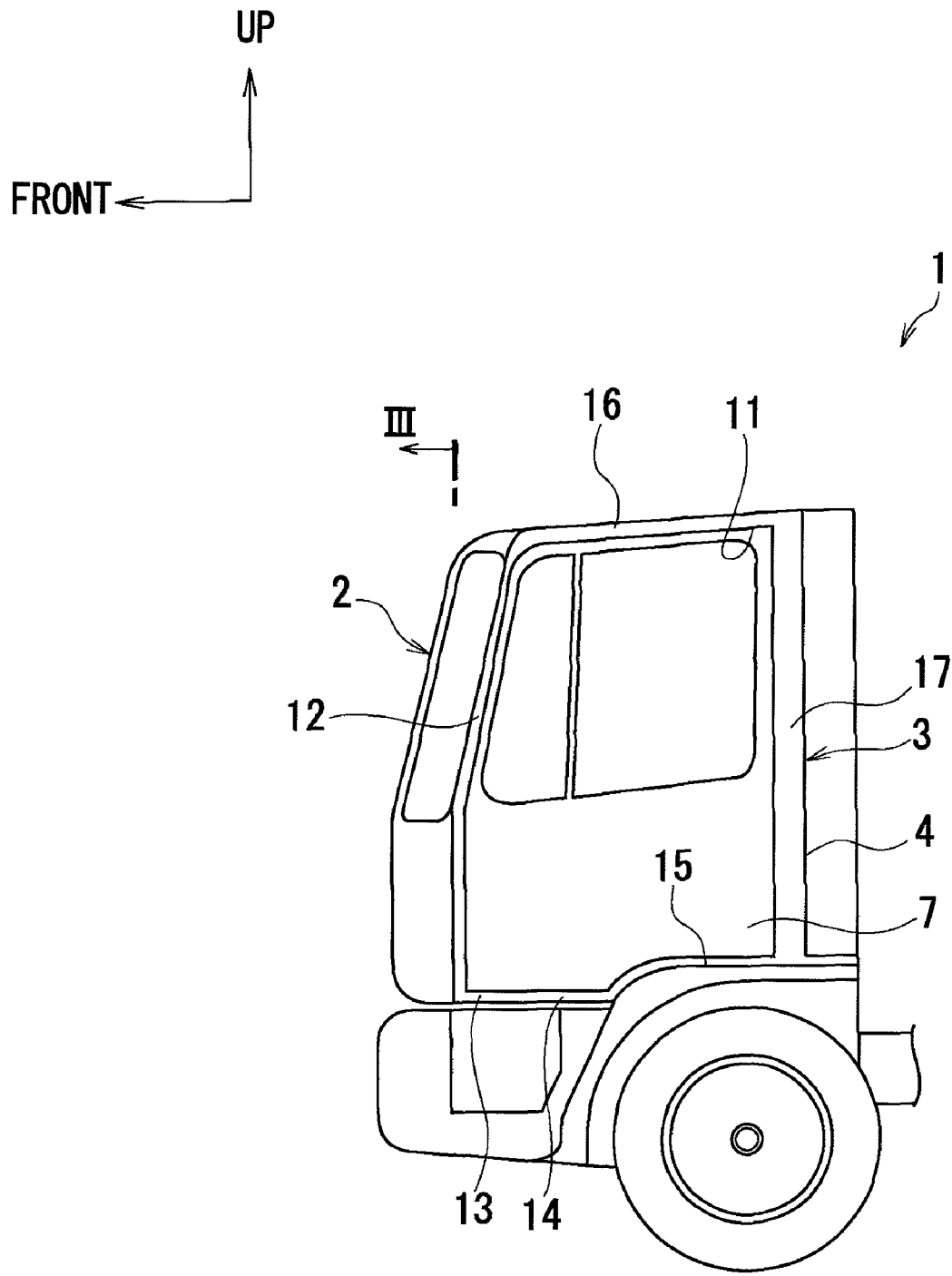
FIG. 1 is an enlarged side view of principal parts of a vehicle according to an embodiment.

1 Vehicle
2 Cab
3 Body side structure
4 Outer panel
5 Inner panel
6 Reinforcement (reinforcement member)
11 Door opening
12 Front pillar outer section
13 Outer front end lower portion
23 Lower edge
26 Front pillar inner section
27 Inner front end lower portion
36 Lower edge
43 Flange (front end lower portion of reinforcement member)
44 Lower edge
45 Outer side
46 Sealing member

BEST MODE FOR CARRYING OUT THE INVENTION

Figure 2:
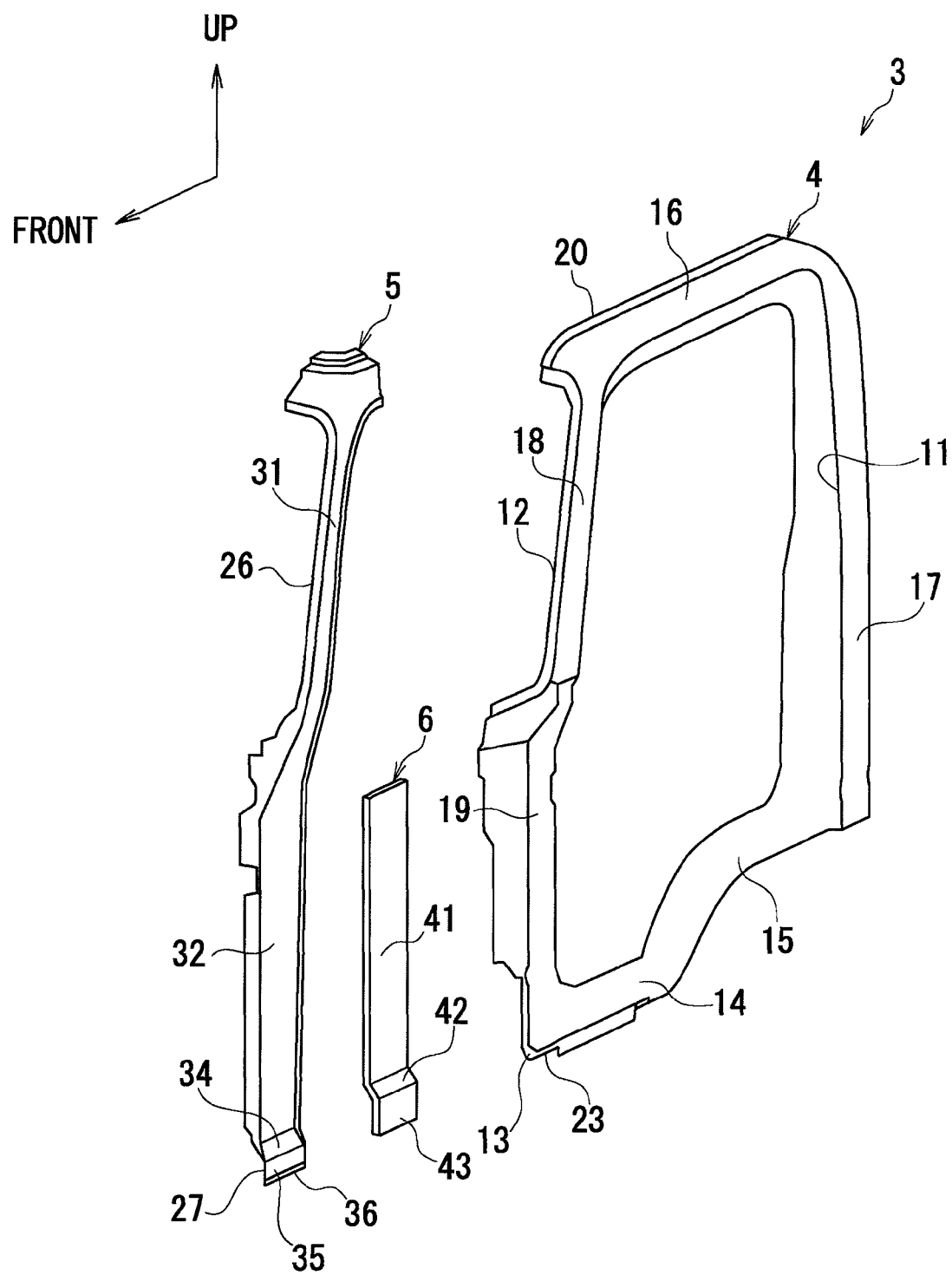
FIG. 2 is an exploded perspective view of a body side structure.
Figure 3:
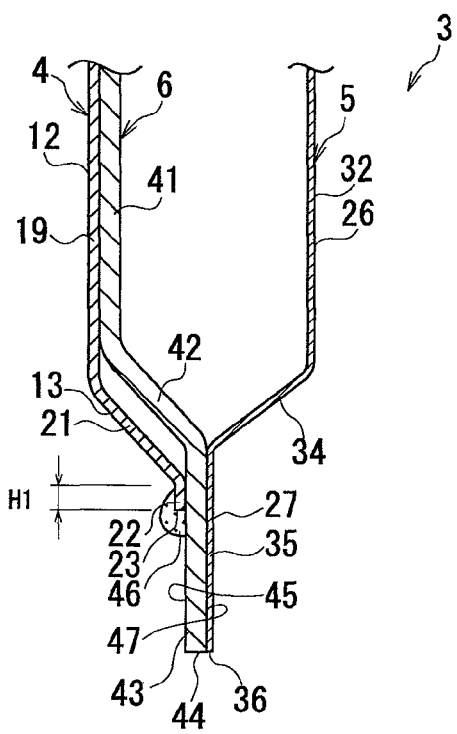
FIG. 3 is a cross section viewed from line of FIG. 1.
Figure 4:
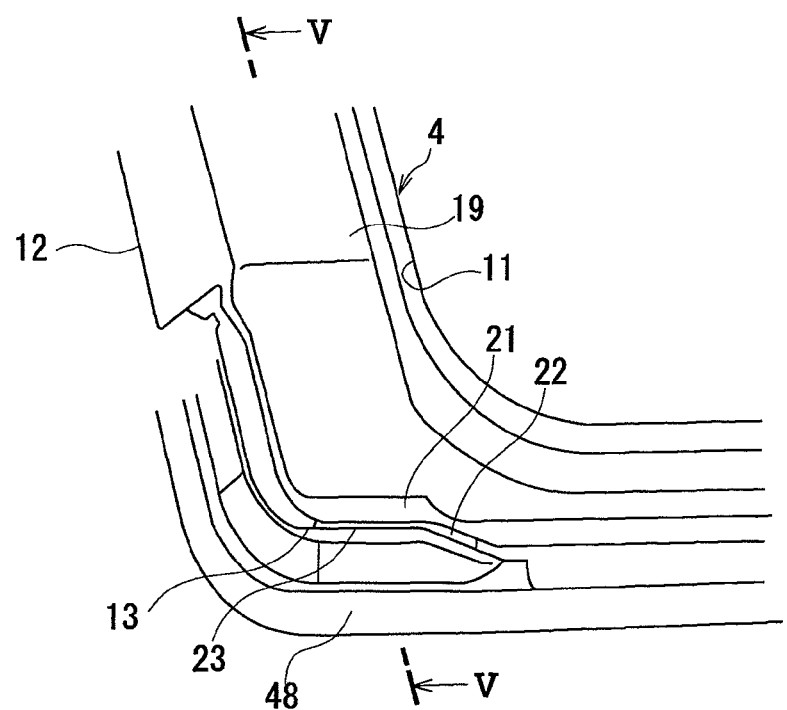
FIG. 4 is an enlarged principal sectional view of an outer front end lower portion including excess metal.
Figure 5:
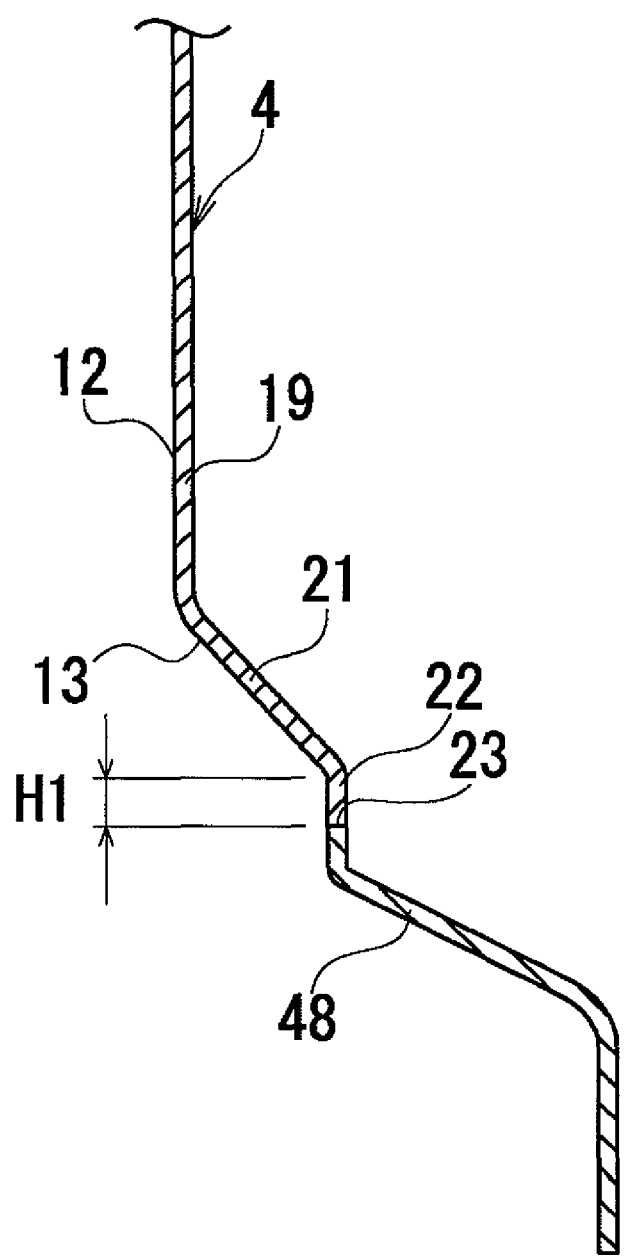
FIG. 5 is a cross section viewed from line V-V of FIG. 4.
Figure 6:
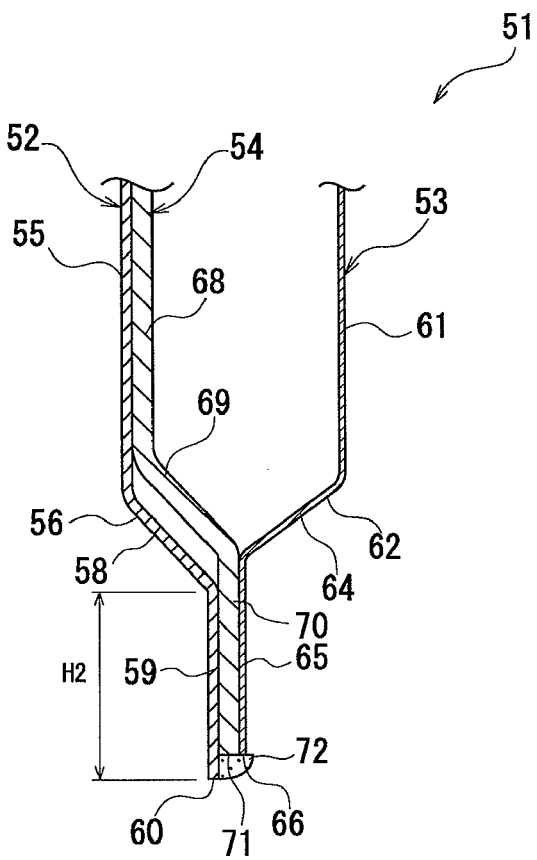
FIG. 6 is an enlarged principal cross-sectional view showing a joined state of an outer front edge lower portion, a reinforcement, and an inner front edge lower portion of another body side structure not applying the body side structure according to the present invention.
Figure 7:
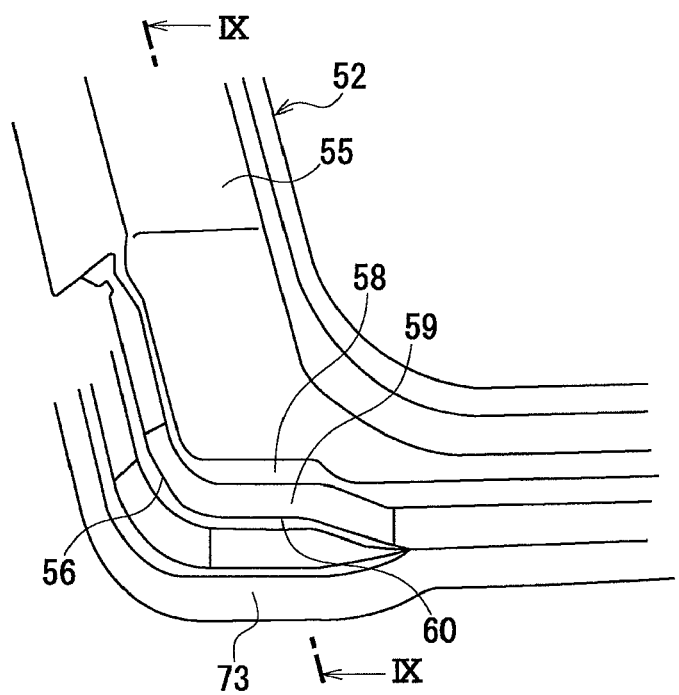
FIG. 7 is an enlarged principal sectional view of an outer front end lower portion including excess metal according to a body side structure other than that of FIG. 6.
Figure 8:
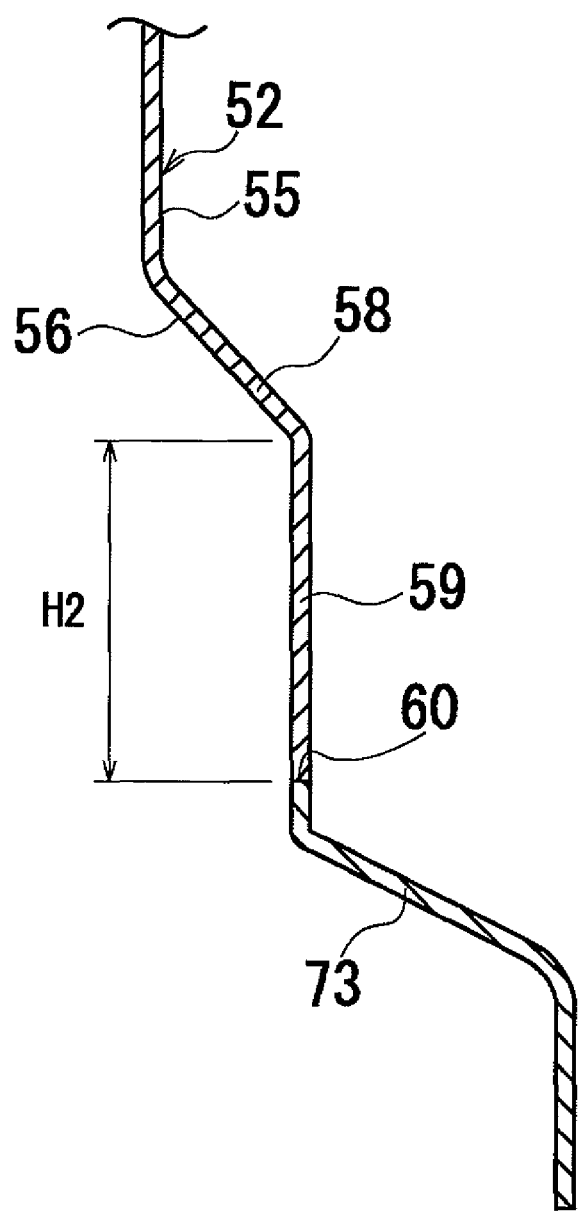
FIG. 8 is a cross section viewed from line IX-IX of FIG. 7.
Figure 9:
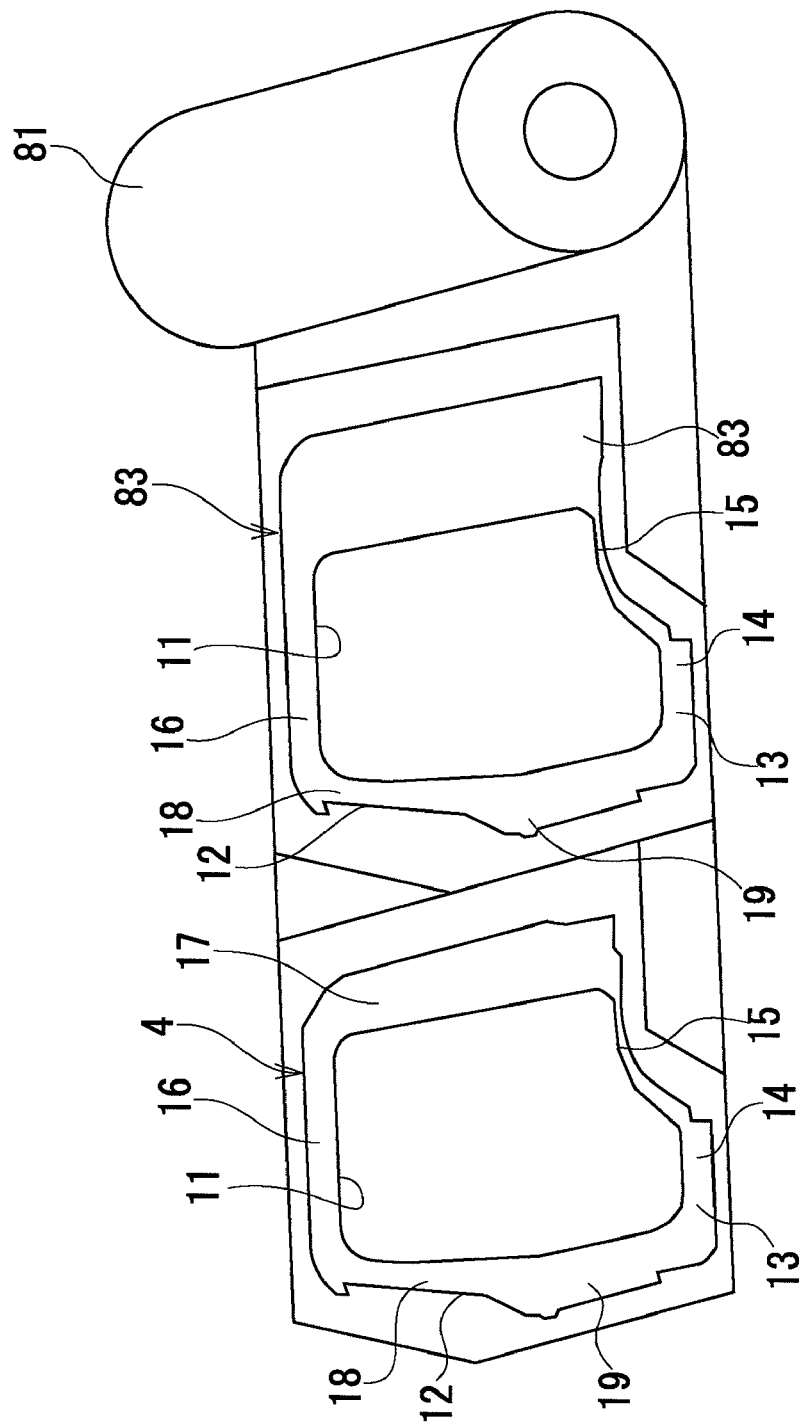
FIG. 9 is a perspective view of a roll material with an outer panel cut out.
Figure 10:
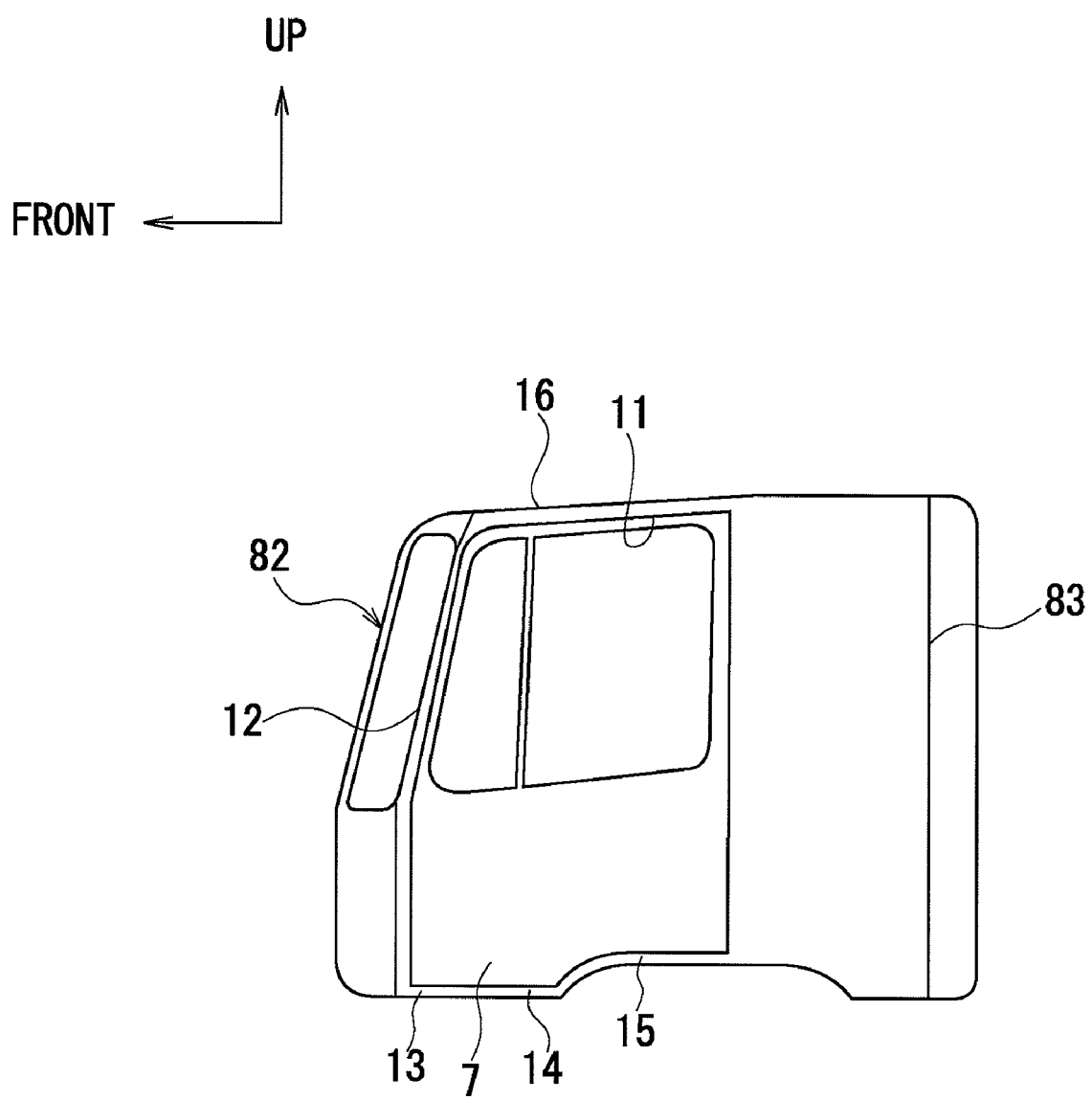
FIG. 10 is a front view of an outer panel of a cab body side with a bed.

An embodiment of the present invention is described forthwith based on the appended drawings. FIG. 1 is an enlarged side view of principal parts of a vehicle according to an embodiment. FIG. 2 is an exploded perspective view of a body side structure. FIG. 3 is a cross section viewed from line of FIG. 1. FIG. 4 is an enlarged principal sectional view of an outer front end lower portion including excess metal. FIG. 5 is a cross section viewed from line V-V of FIG. 4. FIG. 6 is an enlarged principal cross-sectional view showing a joined state of a an outer front edge lower portion, a reinforcement, and an inner front edge lower portion of another body side structure not applying the body side structure according to the present invention. FIG. 7 is an enlarged principal sectional view of an outer front end lower portion including excess metal according to a body side structure other than that of FIG. 6. FIG. 8 is a cross section viewed from line IX-IX of FIG. 7. FIG. 9 is a perspective view of a roll material with an outer panel cut out. FIG. 10 is a front view of an outer panel of a cab body side with a bed. Note that 'FRONT' in the drawings denotes the vehicle front, 'UP' denotes the vehicle top, H1 in FIGS. 3 and 5 denotes flange height, and H2 in FIGS. 6 and 8 denotes flange height.

As shown in FIG. 1, a vehicle 1 according to this embodiment is a cab-over engine truck which generally has the position of the driver's seat (omitted from the drawing) in a cab 2 in front of the engine (omitted from the drawing), wherein the cab 2 includes a body side structure 3 on either side thereof in the vehicle width direction.

As shown in FIG. 2, the body side structure 3 includes an outer panel 4 or outer plate member on sides of the cab 2, an inner panel 5 arranged facing the inner side of the outer panel 4 in the vehicle width direction, and a reinforcement (reinforcement member) 6.

As shown in FIGS. 1 and 2, the outer panel 4 includes a door opening 11 formed in an approximate rectangle, a front pillar outer section 12 formed in an approximately<shape, an outer front end lower portion 13, a locker outer section 14, a fender outer section 15, a roof side rail outer section 16, and a rear pillar outer section 17, wherein these are integratedly formed by press forming.

The door opening 11 is blocked from the front while a door 7 is arranged in a closed position. The front pillar outer section 12 constitutes the front edge of the door opening 11. The outer front end lower portion 13 extends downward from a vertical portion 19 of the front pillar outer section 12 described later. The locker outer section 14 bends and extends toward the vehicle rear from the lower end of the vertical portion 19 of the front pillar outer section 12, constituting a part of the lower edge of the door opening 11. The fender outer section 15 extends arch-like from the back end of the locker outer section 14. The lower end of the fender outer section 15 constitutes wheel house covering a front wheel from above. Moreover, the front end of the fender outer section 15 constitutes a part of the lower edge of the door opening 11. The roof side rail outer section 16 bends and extends toward the vehicle rear from the upper end of a slanted portion 18 of the front pillar outer section 12 described later, constituting the upper edge of the door opening 11. The rear pillar outer section 17 connects the back end of the fender outer section 15 and back end of the side rail outer section 16, constituting a trailing edge of the door opening 11.

As shown in FIGS. 2 and 3, the front pillar outer section 12 includes the slanted portion 18, which swells outward along the vehicle width and slants downward toward the vehicle front, and the vertical portion 19, which bends and extends downward from the lower end of the slanted portion 18. An upper edge 20 of the slanted portion 18 is arranged at the top of the outer panel 4.

The outer front end lower portion 13 includes a bent portion 21, which bends from the lower end of the vertical portion 19 of the front pillar outer section 12, extending at a slant inward along the vehicle width, and a flange 22, which bends and extends downward from the lower end of the bent portion 21. A lower edge 23 of the flange 22 is arranged at the bottom of the outer panel 4.

The inner panel 5 includes a front pillar inner section 26, an inner front end lower portion 27, a locker inner section (omitted from the drawings), a fender inner section (omitted from the drawings), a roof side rail inner section (omitted from the drawings), and a rear pillar inner section (omitted from the drawings), which are each formed separately. The front pillar inner section 26, the inner front end lower portion 27, the locker inner section, the fender inner section, the roof side rail inner section, and the rear pillar inner section are arranged facing the front pillar outer section 12, the outer front end lower portion 13, the locker outer section 14, the fender outer section 15, the roof side rail outer section 16, and the rear pillar outer section 17, respectively. Moreover, each of the inner panels 5 is fixed through welding or anther joining process to corresponding each of the outer panels 4, respectively, between which is formed a closed cross section.

The front pillar outer section 26 includes a slanted portion 31, which swells outward along the vehicle width and slants downward toward the vehicle front, and a vertical portion 32, which bends and extends downward from the lower end of the slanted portion 31, and is formed in approximately the same shape as the front pillar outer section 12. The upper end of the front pillar inner section 26 is joined through welding or another joining process to the upper end of the front pillar outer section 12.

The inner front end lower portion 27 includes a bent portion 34, which bends from the lower end of the vertical portion 32 of the front pillar inner section 26, extending at a slant outward along the vehicle width, and a flange 35, which bends and extends downward from the lower end of the bent portion 34.

The reinforcement 6 is arranged between the front pillar outer section 12 and the front pillar inner section 26, and includes a vertical portion 41, a bent portion 42, which bends from the lower end of the vertical portion 41, extending on a slant inward along the vehicle width, and a flange (front end lower portion of the reinforcement member) 43, which bends and extends downward from the lower end of the bent portion 42. The outer surface of the vertical portion 41 in the vehicle width direction is formed in approximately the same shape as inner surface of the vertical portion 19 of the front pillar outer section 12. An inner surface 47 of the flange 43 in the vehicle width direction is formed in approximately the same shape as outer surface of the flange 35 at the inner front end lower portion 27.

The vertical portion 41 of the reinforcement 6 is fixed to the front pillar outer section 12 through welding or another joining process of an outer edge of the vertical portion 41 while the outer surface of the vertical portion 41 in the vehicle width direction is in contact with the inner surface of the vertical portion 19 of the front pillar outer section 12. The flange 43 of the reinforcement 6 is fixed to the outer front end lower portion 13 through welding or another joining process of an outer edge of the lower edge 23 of the outer front end lower portion 13 while an outer surface 45 of the flange 41 in the vehicle width direction is in contact with the lower edge 23 of the outer front end lower portion 13. Note that this is not limited to contacting and fixing the lower edge 23 of the outer front end lower portion 13 to the outer surface 45 of the flange 43 of the reinforcement 6, and they may be fixed while the lower edge 23 of the outer front end lower portion 13 is arranged very close to the outer surface 45 of the flange 43 of the reinforcement 6.

In the state where the reinforcement 6 is fixed to the front pillar outer section 12 and the outer front end lower portion 13 through welding or another joining process, a lower edge 44 of the flange 43 of the reinforcement 6 is arranged in a position lower than the lower edge 23 of the outer front end lower portion 13. In this state, a sealing member 46, which is for preventing rainwater and the like from penetrating from below, is applied at (a part of) a predetermined position between the lower edge 23 of the outer front end lower portion 13 and the outer surface 45 of the flange 43 of the reinforcement 6. Note that the sealing member 46 may be applied over the entire region between the lower edge 23 of the outer front end lower portion 13 and the outer surface 45 of the flange 43 of the reinforcement 6.

The flange 43 of the reinforcement 6 is fixed to the inner front end lower portion 27 through welding or another joining process of the lower edge 44 thereof and the lower edge 36 of the inner front end lower portion 27 while an inner surface 47 of the flange 43 is in contact with the outer surface of the inner front end lower portion 27. In the state where the reinforcement 6 is fixed to the reinforcement 6 through welding or another joining process, the lower edge 44 of the flange 43 of the reinforcement 6 is arranged in approximately the same position heightwise as the lower edge 36 of the inner front end lower portion 27. Note that with this embodiment, while application of a sealing material in a gap formed between the lower edge 44 of the flange 43 of the reinforcement 6 and the lower edge 36 of the inner front end lower portion 27 is omitted, a sealing material may be applied in the gap.

According to this embodiment, the sealing member 46 is applied only in a part of the gap formed between the lower edge 23 of the outer front end lower portion 13 and the outer surface 45 of the flange 43 of the reinforcement 6, however, a sealing material is not applied in the gap formed between the lower edge 44 of the flange 43 of the reinforcement 6 and the lower edge 36 of the inner front end lower portion 27. This is because, by applying the sealing member 46 to apart of the gap formed between the lower edge 23 of the outer front end lower portion 13 and the outer surface 45 of the flange 43 of the reinforcement 6, penetration of rainwater and the like from below into a closed cross-sectional shaped inner space formed by the front pillar outer section 12 and the front pillar inner section 26 may be sufficiently suppressed. Moreover, even if rainwater or the like penetrates into that inner space, the rainwater and the like from the gap in which the sealing member 46 is not applied may be sufficiently discharged below.

Next, manufacturing an outer panel through integratedly press-forming is described based on FIGS. 4 to 10, with a body side structure according to this embodiment as compared to another body side structure for comparative explanation.

As shown in FIG. 6, another body side structure 51 for comparative explanation includes an outer panel 52 integratedly formed by press forming, an inner panel 53 arranged facing the inner side of the outer panel 4 in the vehicle width direction, and a reinforcement 54 arranged between the outer panel 52 and the inner panel 53.

The outer panel 52 includes a front pillar outer section 55, and an outer front end lower portion 56 extending downward from the front pillar outer section 55. The outer front end lower portion 56 includes a bent portion 58, which bends from the lower end of the front pillar outer section 55, extending at a slant inward along the vehicle width, and a flange 59, which bends and extends downward from the lower end of the bent portion 58.

The inner panel 53 includes a front pillar inner section 61, and an inner front end lower portion 62 extending downward from the front pillar inner section 61. The inner front end lower portion 62 includes a bent portion 64, which bends from the lower end of the front pillar inner section 61, extending at a slant outward along the vehicle width, and a flange 65, which bends and extends downward from the lower end of the bent portion 64.

The reinforcement 54 includes a vertical portion 68, a bent portion 69, which bends from the lower end of the vertical portion 68, extending at a slant inward along the vehicle width, and a flange 70, which bends and extends downward from the lower end of the bent portion 69.

Fixation to the front pillar outer section 55 of the reinforcement 54 is performed through welding or another joining process of an outer edge of the front pillar outer section 55 while the outer surface of the vertical portion 68 of the reinforcement 54 is in contact with the inner surface of the font pillar outer section 55, and through welding or another joining process of a lower edge 60 of the outer front end lower portion 56 and a lower edge 71 of the flange 70 of the reinforcement 54 while the outer surface of the flange 70 of the reinforcement 54 is in contact with the inner surface of the flange 59 at the outer front end lower portion 56. In this state, the lower edge 71 of the flange 70 of the reinforcement 54 is arranged at a higher position than the lower edge 60 of the outer front end lower portion 56.

Fixation to the front pillar inner section 61 of the reinforcement 54 is performed through welding or another joining process of the lower edge 66 of the inner front end lower portion 62 and the lower edge 71 of the flange 70 of the reinforcement 54 while the inner surface of the flange 70 of the reinforcement 54 is in contact with the outer surface of the flange 65 at the inner front end lower portion 62. In this state, the lower edge 66 of the inner front end lower portion 62 and the lower edge 71 of the flange 70 of the reinforcement 54 are arranged in approximately the same position heightwise.

As such, since the position of the lower edge 60 of the outer front end lower portion 56 of the outer panel 52 according to the body side structure 51 is lower than the lower edge 66 of the inner front end lower portion 62 and the lower edge 71 of the flange 70 of the reinforcement 54, distance H2 from the upper end of the flange 59 of the reinforcement 54 to the lower edge 60 is determined according to positions of the lower edge 66 of the inner front end lower portion 62 and the lower edge 71 of the flange of the reinforcement 54.

Note that a sealing member 72 is applied to the lower edge 66 of the inner front end lower portion 62 and the lower edge 71 of the flange 70 of the reinforcement 54 while the reinforcement 54 is fixed to the front pillar outer section 55 and the front pillar inner section 61, thereby sealing the gap formed between the lower edge 60 of the outer front end lower portion 56 and the lower edge 71 of the flange 70 of the reinforcement 54, and gap formed between the lower edge 66 of the inner front end lower portion 62 and the lower edge 71 of the flange 70 of the reinforcement 54.

As shown in FIGS. 6 to 8, excess metal 73 of a certain width is required in the periphery of the outer panel 52, that is periphery of the flange 59 at the outer front end lower portion 56 for pressing the outer panel 52 by a pressing machine (omitted from the drawings) using a rolling material 81 (see FIG. 9) such as sheet metal or aluminum alloy sheet, and the excess metal 73 is cut off after pressing at a position (trimming position) to be the lower edge 71 of the outer front end lower portion 56. Therefore, when setting the entire width of the rolling material 81 according to distance heightwise of the outer panel 52, the entire width of the rolling material 81 must be set according to distance to the upper edge (omitted from the drawings) of the front pillar outer section 55 and the lower edge 60 of the outer front end lower portion 56 including the excess metal 73. In other words, since height H2 of the flange 59 is determined according to positions of the lower edge 66 of the inner front end lower portion 62 and the lower edge 71 of the flange 70 of the reinforcement 54, the distance H2 will increase if the flange 65 at the inner front end lower portion 62 and the flange 70 of the reinforcement 54 are extended downward. In this case, the distance between the upper edge of the front pillar outer section 55 and the lower edge 60 of the outer front end lower portion 56 increases, leading to growth in size of the rolling material 81 and increase in cost.

On the other hand, as shown in FIGS. 3 to 5 and 9, the lower edge 23 of the outer front end lower portion 13 of the outer panel 4 according to this embodiment is arranged at a higher position than the lower edge 36 of the inner front end lower portion 27 and the lower edge 44 of the flange 43 of the reinforcement 6. Therefore, height H1 of the flange 43 at the outer front end lower portion 13 may be set short irrelevantly to positions of the lower edge 36 of the inner front end lower portion 27 or the lower edge 44 of the flange 43 of the reinforcement 6. As a result, distances heightwise of the upper edge (see FIG. 2) of the front pillar outer section 12 and the lower edge 23 of the outer front end lower portion 13 including excess metal 48 is shortened as the height H1 is shortened, thereby allowing shortened entire width of the rolling material 81 used for die cutting the outer pane 4, and reduction in cost. Note that the excess metal 48 is cut off after pressing at a position (trimming position) to be the lower edge 23 of the outer front end lower portion 13.

As shown in FIGS. 9 and 10, since the entire width of the rolling material 81 may be set according to distance heightwise of the outer panel 4, a shared rolling material 81 may be used not only for the outer panel 4, but even for vehicle types differing in only width of the outer panel 4 in the vehicle front-back direction, that is to say, the outer panel 83 of the cab 82 provided with a bed in the same vehicle type. Therefore, since the rolling material 81 will be made uniform, provision of a simple structure of the outer panels 4 and 83 is possible.

As such, according to the body side structure 3 of this embodiment, growth in size of the rolling material 81 used in die cutting may be controlled, and the outer panel 4 used for the body sides of the cab 2 formed by press forming may be formed integratedly.

Moreover, with this embodiment, the sealing member 46 is applied in part of the gap formed between the lower edge 23 of the outer front end lower portion 13 and the outer surface 45 of the flange 43 of the reinforcement 6. Namely, application of the sealing member 46 needs only to be carried out in a portion of the gap through which rainwater and the like can easily penetrate into the outer panel 4. Even if rainwater or the like penetrates into the outer panel 4 via the gap, the rainwater and the like from the gap in which the sealing member 46 is not applied may be sufficiently discharged below. As a result, application of the sealing member 46 in the entire gap is unnecessary, allowing simplification of manufacturing and reduction in cost.

While the embodiment according to the invention devised by the inventor(s) has been described thus far, the present invention is not limited to the descriptions and drawings of this embodiment constituting a part of the disclosure of the present invention. Namely, it should be added that other embodiments, working examples, and operational technologies devised by person(s) skilled in the art according to this embodiment are all naturally included within the scope of this invention.

INDUSTRIAL APPLICABILITY

The body side structure of the present invention is applicable to various vehicles.

The invention claimed is:
1. A vehicle body side structure, comprising:
an outer panel integratedly formed by press forming;
an inner panel arranged facing the inner side of the outer panel in the vehicle width direction; and
a reinforcement member arranged between the outer panel and the inner panel, wherein
the outer panel comprises a front pillar outer section, and an outer front end lower portion extending downward from the front pillar outer section;
the inner panel comprises a front pillar inner section, and an inner front end lower portion extending downward from the front pillar inner section;

the front pillar outer section and the front pillar inner section form a closed cross section, which partitions the front of a door opening;

a front end lower portion of the reinforcement is joined to the inner front end lower portion; and a lower edge which is disposed at the most lower end of the outer front end lower portion and is adjacent to or in contact with an outer surface of the front end lower portion of the reinforcement at a higher position than a lower edge of the inner front end lower portion and a lower edge of the front end lower portion of the reinforcement.

2. The vehicle body side structure of claim 1, further comprising:

a sealing member, which seals at least a part of between the outer front end lower portion and the front end lower portion of the reinforcement.

3. The vehicle body side structure of claim 1, wherein the outer front end lower portion, the inner front end lower portion, and the front end lower portion of the reinforcement extend subtantially parallel to one another downward in a vehicle height direction.

4. The vehicle body side structure of claim 1, wherein the inner front end lower portion together with the joined front end lower portion of the reinforcement extend downward in a vehicle height direction longer than the outer front end lower portion which is disposed adjacent to or in contact with the outer surface of the front lower portion of the reinforcement.

* * * * *